(12) United States Patent
Maeda et al.

(10) Patent No.: US 7,854,052 B2
(45) Date of Patent: Dec. 21, 2010

(54) PART POSITIONING DEVICE

(75) Inventors: Yasuyuki Maeda, Toon (JP); Ko Shinomori, Toon (JP); Masayoshi Matsumoto, Toon (JP)

(73) Assignee: Panasonic Corporation, Osaka (JP)

( * ) Notice: Subject to any disclaimer, the term of this patent is extended or adjusted under 35 U.S.C. 154(b) by 1126 days.

(21) Appl. No.: 10/593,601

(22) PCT Filed: May 24, 2006

(86) PCT No.: PCT/JP2006/310365

§ 371 (c)(1),
(2), (4) Date: Sep. 21, 2006

(87) PCT Pub. No.: WO2006/126593

PCT Pub. Date: Nov. 30, 2006

(65) Prior Publication Data

US 2007/0246591 A1    Oct. 25, 2007

(30) Foreign Application Priority Data

May 25, 2005  (JP) .............................. 2005-151704

(51) Int. Cl.
*B23Q 17/00* (2006.01)
*G11B 15/32* (2006.01)
(52) U.S. Cl. ................................. 29/407.05; 242/324.1
(58) Field of Classification Search ................... 29/557, 29/559, 406, 407.01, 407.05, 407.09, 466, 29/468, 707, 709, 721, 729, 759, 760, 806; 242/324.1
See application file for complete search history.

(56) References Cited

U.S. PATENT DOCUMENTS

| 2,004,918 | A | * | 6/1935 | Mitchell ................... 455/152.1 |
| 4,384,334 | A |   | 5/1983 | Tateishi et al. .............. 364/481 |
| 5,483,391 | A |   | 1/1996 | Gweon et al. ................. 360/69 |

FOREIGN PATENT DOCUMENTS

| CN | 2383504 Y | 6/2000 |
| EP | 0 625 691 | 12/1998 |
| JP | 55-148495 | 11/1980 |
| JP | 57-29359  | 6/1982 |

(Continued)

*Primary Examiner*—John C Hong
(74) *Attorney, Agent, or Firm*—Steptoe & Johnson LLP

(57) ABSTRACT

A part positioning device (41) provided with support pins (48) which support a magnetic tape recording/reproducing device (1), a measuring device (51) which measures the height and inclination of a top end face (3*a*) of a reel (3) of the recording/reproducing device (1) and turning operation devices (54) which turn adjusting screws (7) which adjust the height and inclination of the reel (3). The turning operation device (54) includes an engaging part (55) which engages/disengages with/from an engagement groove (8) formed vertically in the adjusting screw (7), a turning operation part (57) which is turned by manual operation, and a turning transmission shaft (59) which is bendable to transmit the turning of the turning operation part (57) to the engaging part (55). The engaging part (55) is disposed at a position facing the underside of the adjusting screw (7) and moved vertically with respect to the engagement groove (8) by manually pushing or pulling the turning operation part (57) in the horizontal direction (C, D). The turning operation part (57) is disposed on the front side where the operator performs operation.

3 Claims, 7 Drawing Sheets

FOREIGN PATENT DOCUMENTS

| | | |
|---|---|---|
| JP | 59-33658 | 2/1984 |
| JP | 61-57336 | 4/1986 |
| JP | 62-5700 | 1/1987 |
| JP | 08-14865 | 1/1996 |
| JP | 08-201017 | 8/1996 |
| TW | M248014 | 10/2004 |

\* cited by examiner

PART POSITIONING DEVICE

FIELD OF THE INVENTION

The present invention relates to a part positioning device which positions a part such as a reel or guide post of a magnetic tape recording/reproducing device.

BACKGROUND OF THE INVENTION

FIG. 6 is a perspective view of a magnetic tape recording/reproducing device 1 (example of adjustment target object) which is positioned using a part positioning device. This magnetic tape recording/reproducing device 1 is provided with a planar base 2, a C reel 3 and a D reel 4 and a plurality of guide posts 5. The C reel 3 and D reel 4 are intended to feed and wind a magnetic tape. The guide posts 5 are intended to position a running magnetic tape. The reels 3, 4 and guide posts 5 are examples of adjustment target parts and provided on the base 2. The inclination in the X-Y directions and height in the Z direction of the reels 3, 4 and guide posts 5 are adjusted by turning a plurality of (three, for example) adjusting screws 7 (examples of adjusting member). Each adjusting screw 7 is screwed into the base 2 from below and has a head at the bottom. A "+" (plus) shaped engagement groove 8 (example of engaged part) is formed on the head of each adjusting screw 7.

Furthermore, reference points 10 are formed at three locations of the underside of the base 2 and one article reference surface S which passes through these reference points 10 is defined.

FIGS. 7A and 7B and FIG. 8 show a conventional part positioning device 20 used for positioning parts of the above described magnetic tape recording/reproducing device 1. This part positioning device 20 includes an adjustment stage 21, a plurality of (three, for example) support pins 22 (examples of support member) which support and fix the magnetic tape recording/reproducing device 1 on the adjustment stage 21 and a measuring device 23 which measures the height and inclination of the respective reels 3, 4 and guide posts 5. The above described respective support pins 22 are provided on the adjustment stage 21 and support the magnetic tape recording/reproducing device 1 at the above described reference points 10.

The measuring device 23 is constructed of an inclination measuring device 23b which measures inclinations in the X-Y directions of respective top end faces 3a, 4a, 5a of the reels 3, 4 and guide posts 5 and a displacement measuring device 23a which measures heights in the Z direction of the respective top end faces 3a, 4a, 5a. The displacement measuring device 23a and inclination measuring device 23b are provided on a movable table 24. This movable table 24 is placed on the adjustment stage 21 in a manner freely movable in the X-Y directions.

A display section 23d which displays the measured inclination is provided on the front of the inclination measuring device 23b. Furthermore, a display section 23c which displays the measured height is provided on the front of the displacement measuring device 23a. Furthermore, a laser measuring device is used for the measuring devices 23a, 23b. Furthermore, as shown in FIG. 6, the respective top end faces 3a, 4a, 5a of the reels 3, 4 and guide posts 5 are examples of part reference surfaces.

Furthermore, an adjustment opening 25 is formed in the adjustment stage 21 below and facing the magnetic tape recording/reproducing device 1 which is supported by the support pins 22.

According to this, as shown in FIGS. 7A and 7B and FIG. 8, the reference points 10 of the magnetic tape recording/reproducing device 1 are supported by the support pins 22 and the magnetic tape recording/reproducing device 1 is thereby fixed. For example, when the height and inclination of the C reel 3 are adjusted, the inclination measuring device 23b and displacement measuring device 23a are moved above the C reel 3 using the movable table 24, the inclination of the top end face 3a of the C reel 3 is measured using the inclination measuring device 23b and the height of the top end face 3a of the C reel 3 is measured using the displacement measuring device 23a. In this case, the measured inclination and height are displayed on the display sections 23c, 23d respectively.

An operator M checks, the inclination and height by reading the measured values displayed on the display sections 23c, 23d, then visually checks the positions of the adjusting screws 7 of the C reel 3, inserts a Phillips screwdriver 27 into the adjustment opening 25 from below the adjustment stage 21, fits the tip of the screwdriver 27 into the engagement groove 8 of the adjusting screw 7 and turns the screwdriver 27. The adjusting screw 7 turns and the inclination and height of the C reel 3 change. In this way, the operator M operates the screwdriver 27 while reading the measured values displayed on the display sections 23c, 23d and checking the inclination and height and adjusts the adjusting screws 7 so that the above described measured values match adjustment target values. This makes it possible to adjust the relative height and inclination of the top end face 3a of the C reel 3 with respect to the article reference surface S which passes through the reference points 10 of the magnetic tape recording/reproducing device 1.

It is also possible to adjust the height and inclination of the D reel 4 or guide post 5 in the same way.

However, according to the above described conventional format, as shown in FIG. 7A, the operator M needs to peer the underside of the magnetic tape recording/reproducing device 1, fit the tip of the screwdriver 27 into the engagement groove 8 of the adjusting screw 7. This involves a problem that the work efficiency is extremely low.

Moreover, when the number of adjustment target parts such as reels 3, 4 and guide posts 5 increases, the number of the adjusting screws 7 also increases, which involves a problem that it takes time to visually check the positions of the adjusting screws 7 to be adjusted. Furthermore, meeting the adjustment accuracy requires a plurality of (e.g., 3) adjusting screws 7 to be alternately turned for one adjustment target part (e.g., C reel 3). Therefore, it is necessary to move the screwdriver 27, fit the tip of the screwdriver 27 into the engagement groove 8 of the target adjusting screw 7 every time, which results in a problem that the work efficiency deteriorates considerably.

Furthermore, when a plurality of adjusting screws 7 are turned simultaneously using a plurality of screwdrivers 27, there is a problem that when the adjusting screws 7 are close to each other, the screwdrivers 27 interfere with each other making the operation impossible.

Furthermore, when laser measuring devices are used as the measuring device 23b, 23a, as shown in FIG. 7A, when the operator M peers the underside of the magnetic tape recording/reproducing device 1 and fits the tip of the screwdriver 27 into the engagement groove 8 of the adjusting screw 7, it is necessary to shield laser beams irradiated from the measuring devices 23b, 23a and secure safety, which results in a problem that the work efficiency further deteriorates.

Therefore, it is an object of the present invention to provide a part positioning device capable of drastically improving the efficiency and safety of adjustment work of adjusting the height and inclination of an adjustment target part.

DISCLOSURE OF THE INVENTION

A first aspect of the present invention is a part positioning device for adjusting positions of target parts of an adjustment target object provided with the adjustment target parts and adjusting members, the adjustment target object having an article reference surface defined thereon, the adjustment target parts having part reference surfaces formed thereon respectively, wherein a relative height and inclination of each of the part reference surfaces is adjusted with respect to the article reference surface of the adjustment target object by turning the adjusting members. Herein, the part positioning device comprises support members for supporting the adjustment target object at a plurality of locations, a measuring device for measuring the height and inclination of each of the part reference surfaces of the adjustment target parts, and a turning operation device for turning each of the adjusting members, wherein each turning operation device comprises an engaging part which is engageable/disengeagable with/from an engaged part formed in the adjusting member, a turning operation part which is turned through an external operation, and a bendable turning transmission shaft which transmits the turning of the turning operation part to the engaging part, each engaging part is disposed at a position facing the adjusting member and moved in the engagement/disengagement direction with respect to the engaged part by moving the turning operation part in an axial direction of the turning transmission shaft through an external operation, and each turning operation part is directed to a side where an operator performs operation.

According to such a construction, the operator supports the adjustment target object by the support members, moves the turning operation part of the turning operation device in the axial direction of the turning transmission shaft to cause the engaging part to engage with the engaged part of the adjusting member, and turns the turning operation part. This causes the torque of the turning operation part to transmit to the engaging part through the turning transmission shaft, causes the engaging part to turn, which causes the adjusting member to turn. Thereby, the height and inclination of the part reference surface of the adjustment target part is changed.

The operator measures the height and inclination of the part reference surface of the adjustment target part using the measuring device, turns the turning operation part based on this measured value, and adjusts the measured value so as to match the adjustment target value. In this way, the relative height and inclination of the part reference surface of the adjustment target part is adjusted with respect to the article reference surface S of the adjustment target object.

In the above described adjustment work, since the turning operation part is directed to the side where the operator performs operation, it is easier to perform a transfer operation and a turning operation of the turning operation part. It is also possible to cause the engaging part to engage/disengage with/from the engaged part of the adjusting member of the adjustment target object supported by the support member through a simple operation of only moving the turning operation part of the turning operation device in the axial direction of the turning transmission shaft. Furthermore, even when the number of adjustment target parts increases and the number of adjusting members also increases accordingly, provision of a turning operation device in correspondence with each adjusting member makes it possible to easily turn each adjusting member using each turning operation device. Furthermore, when the plurality of adjusting members are turned simultaneously and even when the adjusting members are close to each other, it is possible to prevent such conventional problem that the screwdrivers interfere with each other making the operation impossible. Consequently, the efficiency of adjustment work is drastically improved.

A second aspect of the present invention is the part positioning device, wherein a first reference surface and a second reference surface are formed to have a predetermined positional relationship each other, a movable table is formed on the first reference surface, the measuring device is provided on the movable table, and the plurality of support members are provided on the second reference surface.

A third aspect of the present invention is the part positioning device, wherein the adjustment target object is supported by the support members with the engaged parts formed in the adjusting members facing downward, the measuring device irradiates a laser beam downward from above on the top reference surfaces of the adjustment target parts and measures the height and inclination of the top reference surfaces, the engaging part of the turning operation device is disposed to face upward at a position underneath the bottom face of the adjusting member, and is caused to move vertically with respect to the engaged part to engage/disengage with/from the engaged part by moving the turning operation part in the horizontal direction through an external operation, and each turning operation part is provided on the front side where an operator performs operation.

According to such constructions, when an operator moves the turning operation part in the horizontal direction on the front side of the part positioning device, the engaging part of the turning operation device moves in the vertical direction and the engaging part engages/disengages with/from the engaged part of the adjusting member. Therefore, when the engaging part is made to engage/disengage with/from the engaged part of the adjusting member, the operator needs not peer the underside of the adjustment target object, and there is no need for shielding the laser beam irradiated downward from the measuring device. Consequently, the efficiency of adjustment work, as well as the safety, is further improved.

DESCRIPTION OF THE EMBODIMENTS

For more detailed explanations of the present invention, the present invention will be explained using the attached drawings.

Figure 6:
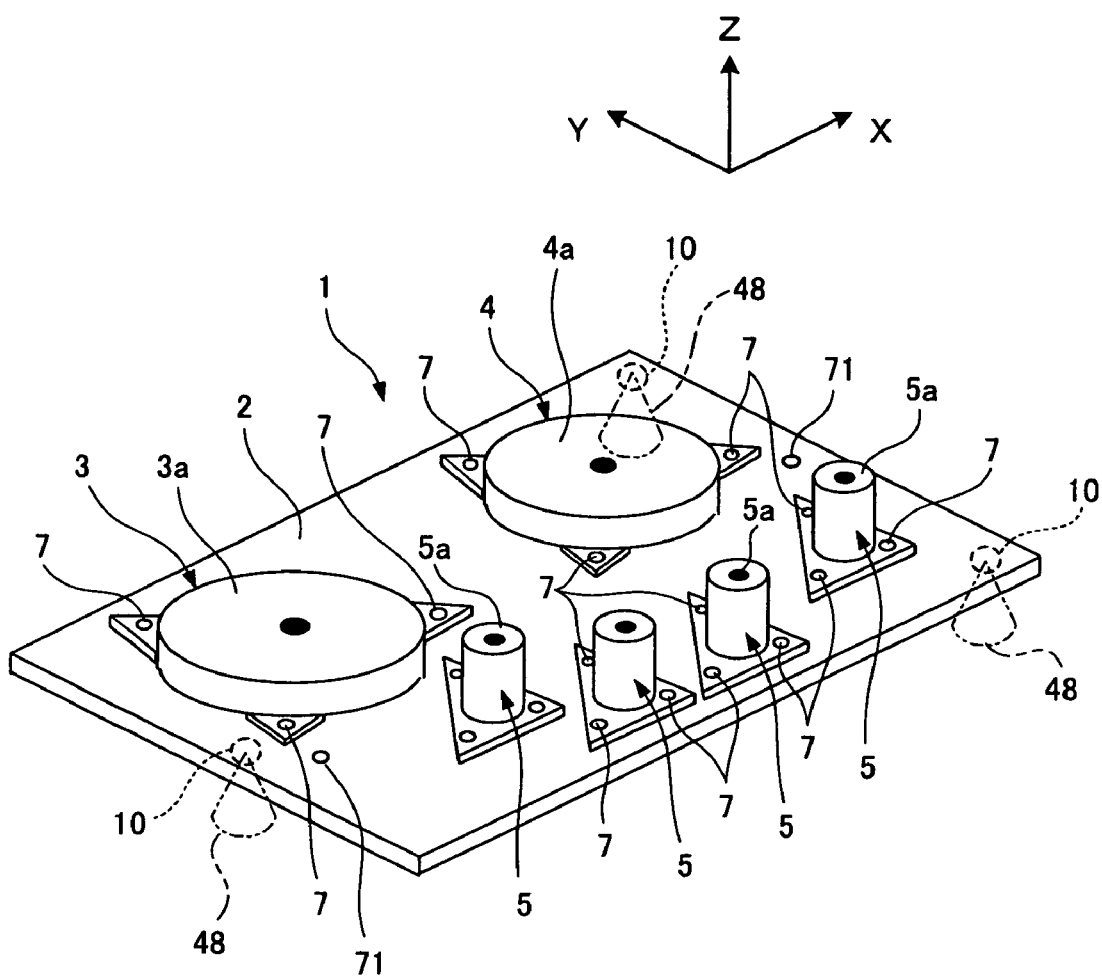
FIG. 6 is a perspective view of a magnetic tape recording/reproducing device whose parts are positioned using the part positioning device according to the embodiment of the present invention.
Figure 7A:
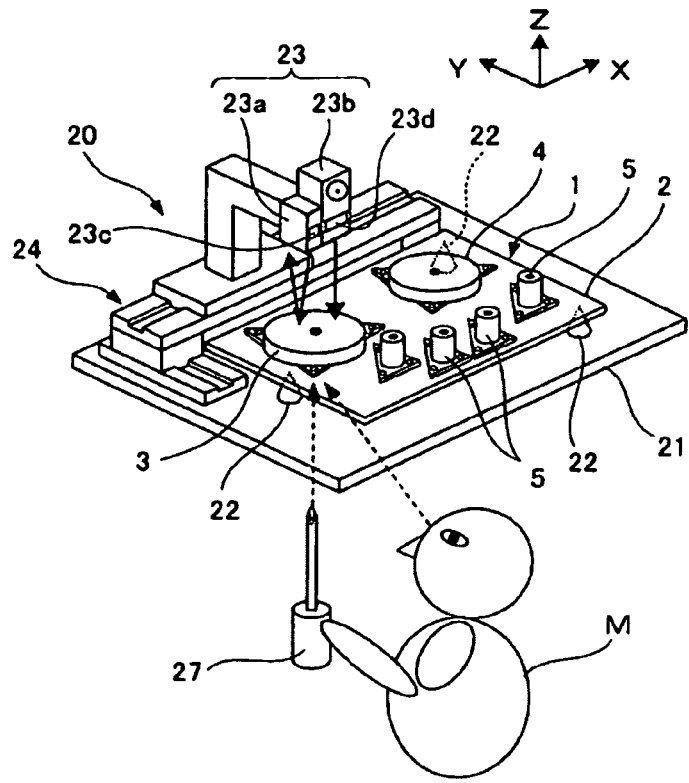
FIG. 7A is a perspective view of a conventional part positioning device showing an operation of engaging the tip of a screwdriver with an adjusting screw of the magnetic tape recording/reproducing device.
Figure 7B:
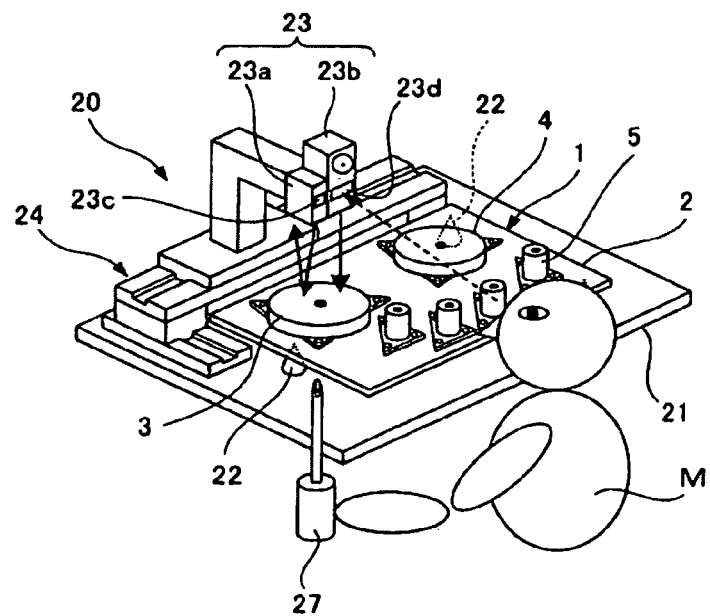
FIG. 7B is a perspective view of a conventional part positioning device showing an operation of turning the adjusting screw using the screwdriver while visually checking measured values measured using a measuring device.
Figure 8:
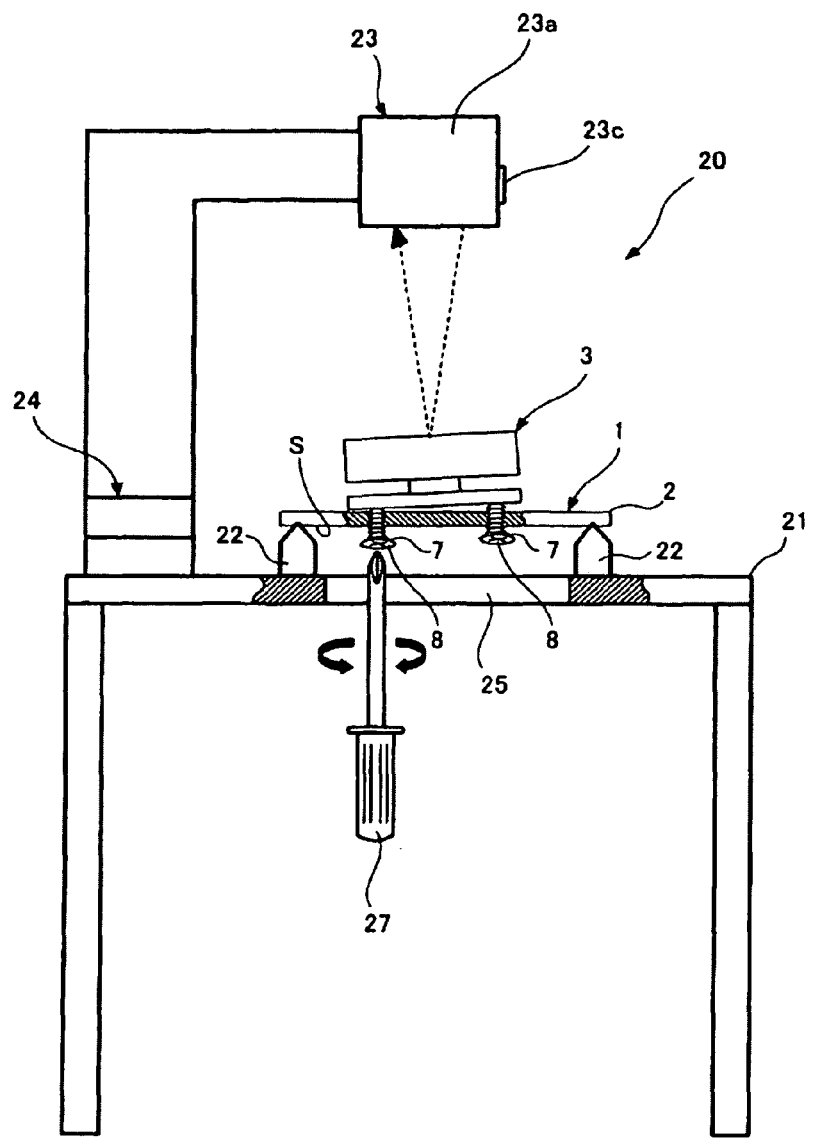
FIG. 8 is a partially cut-out side view of the conventional part positioning device.

A magnetic tape recording/reproducing device 1, which is an example of an adjustment target object, is the same as that shown in FIG. 6 explained in the above described background art, and therefore explanations thereof will be omitted.

Figure 1:
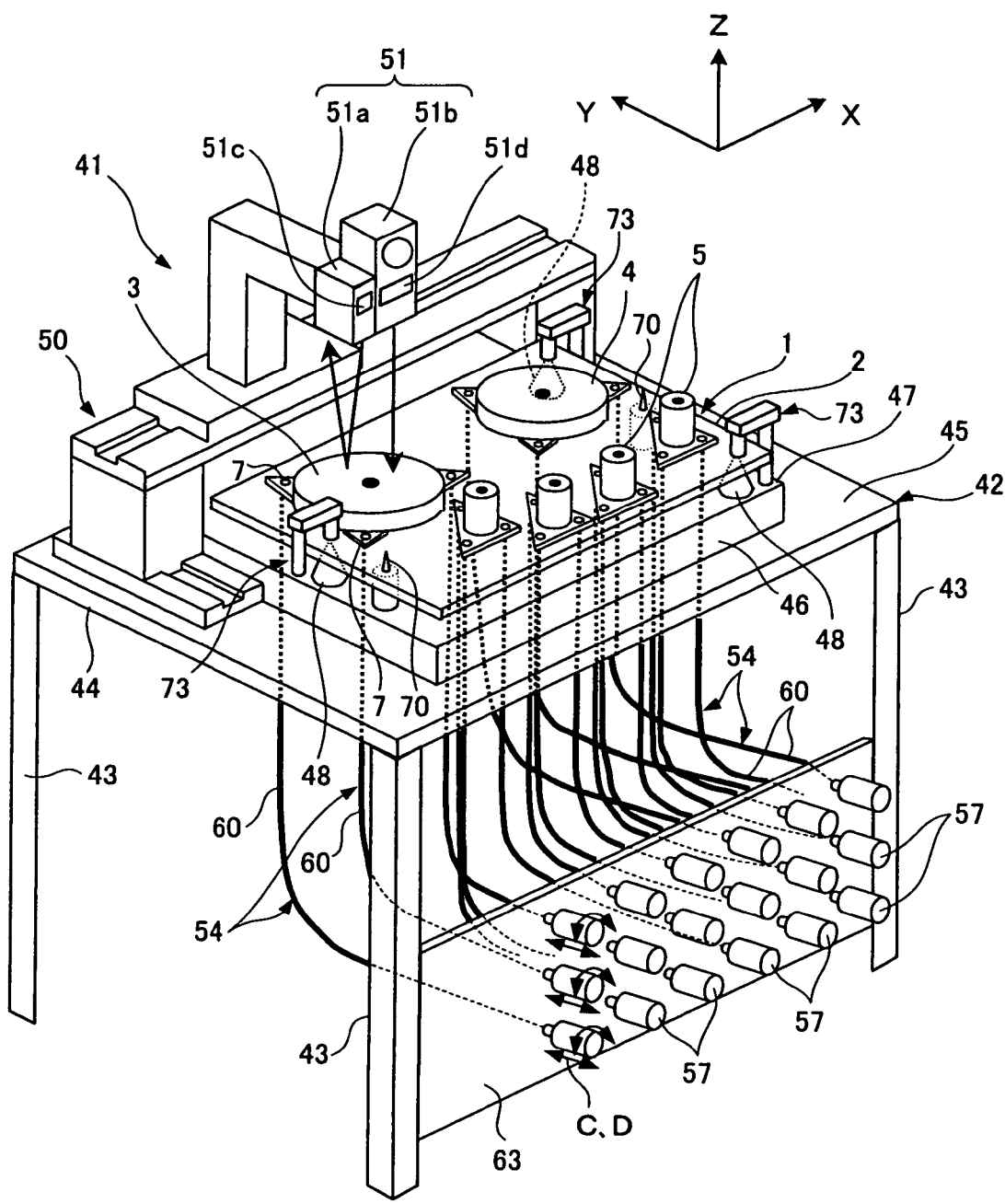
FIG. 1 is a perspective view of a part positioning device according to an embodiment of the present invention.
Figure 2:
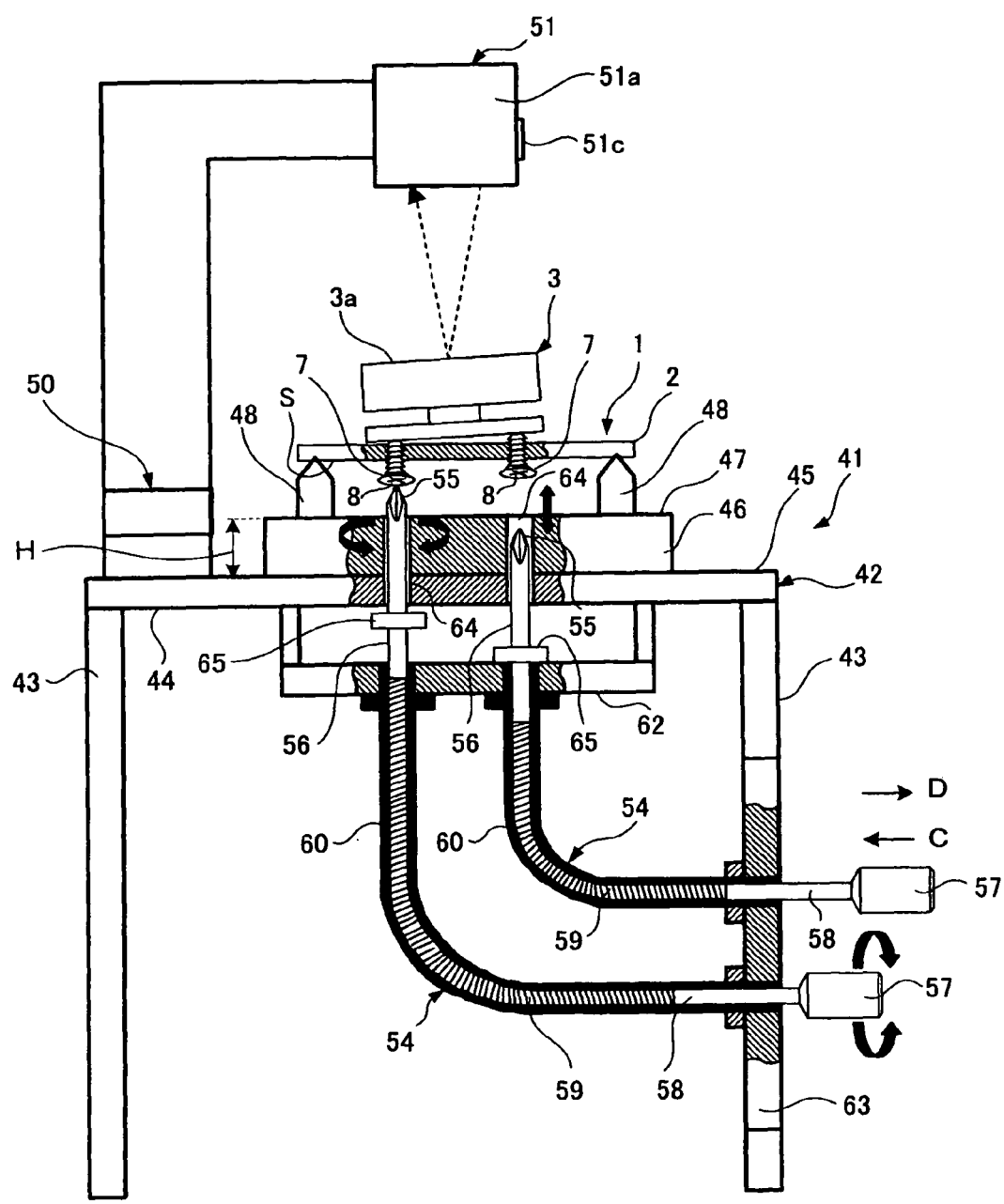
FIG. 2 is a partially cut-out side view of the part positioning device according to the embodiment of the present invention.
Figure 3:
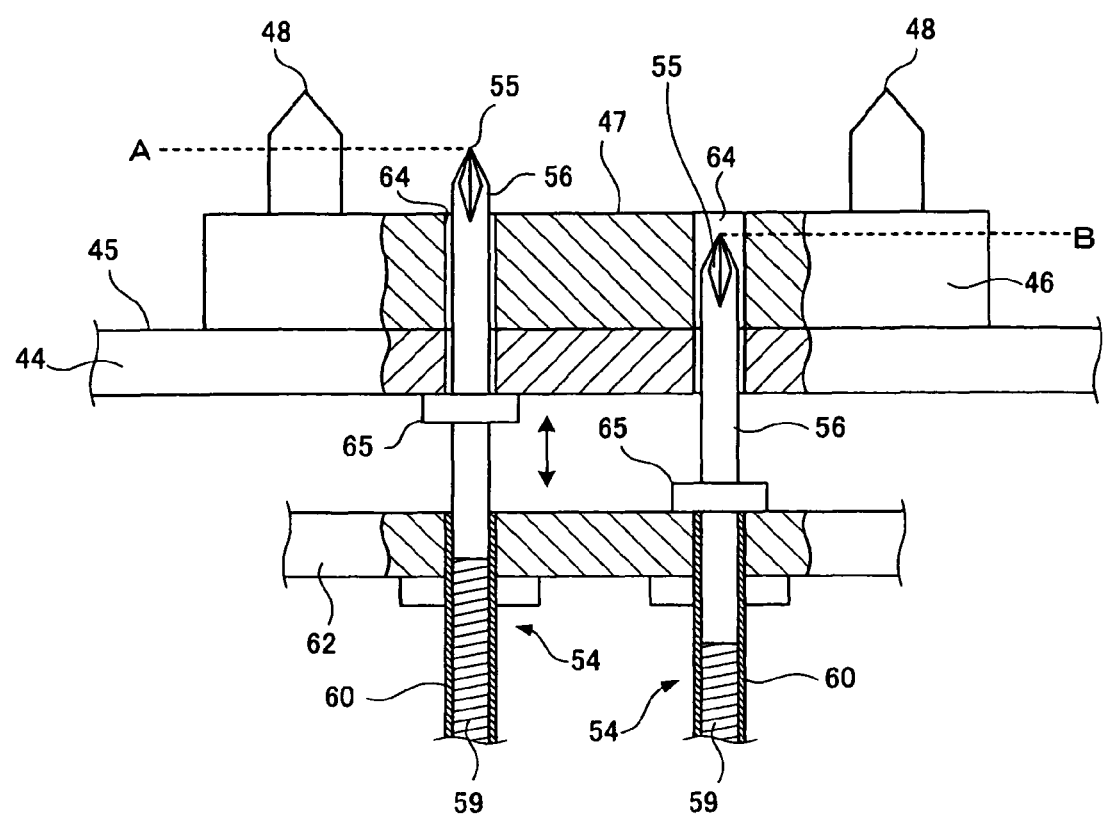
FIG. 3 illustrates an upper limit position and lower limit position of the engaging part of the turning operation device of the part positioning device according to the embodiment of the present invention.

As shown in FIG. 1 to FIG. 3, a part positioning device 41 is intended to position parts of a magnetic tape recording/reproducing device 1 and has the following construction.

An adjustment stage 42 is constructed of four legs 43 and a mounting plate 44 attached on these legs 43. The top surface of this mounting plate 44 is made level as a first reference surface 45. A support stage 46 is provided on the mounting plate 44, which stands out by one step above the first reference surface 45. The top surface of this support stage 46 is made level as a second reference surface 47. Note that the second reference surface 47 is parallel to the first reference surface 45 and is located above the first reference surface 45 by a certain height H.

Support pins 48 (examples of support member) are provided upright at three locations of the above described second reference surface 47 which support the magnetic tape recording/reproducing device 1 at reference points 10.

Furthermore, the above described first reference surface 45 is provided with a movable table 50 which is freely movable in the X-Y directions. This movable table 50 is provided with a measuring device 51 which measures the height and inclination of top end faces 3a, 4a, 5a (examples of part reference surface) of reels 3, 4 (examples of adjustment target part) and guide posts 5 (examples of adjustment target part) of the magnetic tape recording/reproducing device 1 supported by the above described support pins 48.

The measuring device 51 is constructed of an inclination measuring device 51b and a displacement measuring device 51a. The inclination measuring device 51b is intended to irradiate a laser beam from above downward onto the top end faces 3a, 4a, 5a to measure the inclinations of the top end faces 3a, 4a, 5a in the X-Y directions. A display section 51d which displays the measured inclination is provided on the front of the inclination measuring device 51b. On the other hand, the displacement measuring device 51a is intended to irradiate a laser beam from above downward onto the top end faces 3a, 4a, 5a to measure the heights of the top end faces 3a, 4a, 5a in the Z direction. A display section 51c which displays the measured height is provided on the front of the displacement measuring device 51a.

Figure 4:
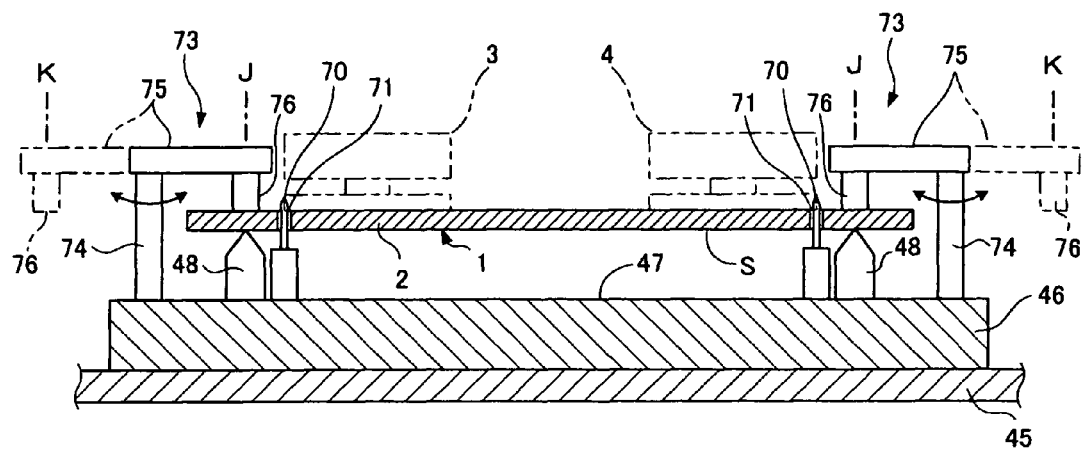
FIG. 4 illustrates the positioning unit and fixing unit of the part positioning device according to the embodiment of the present invention.

As shown in FIG. 1 and FIG. 4, the above described support stage 46 is provided with positioning members for positioning the magnetic tape recording/reproducing device 1 supported by the support pins 48 in the X-Y directions. This positioning member is made up of two (a plurality of) positioning pins 70 placed upright on the second reference surface 47. When the magnetic tape recording/reproducing device 1 is supported by the support pins 48, the above described respective positioning pins 70 are inserted into two (a plurality of) positioning holes 71 formed in the base 2 of the magnetic tape recording/reproducing device 1 and the magnetic tape recording/reproducing device 1 is thereby positioned.

Furthermore, the support stage 46 is provided with three (a plurality of) fixing devices 73. These fixing devices 73 are intended to prevent the magnetic tape recording/reproducing device 1 supported by the support pins 48 and positioned by the positioning pins 70 from moving upward and fix the magnetic tape recording/reproducing device 1 in a normal position. Each of these fixing devices 73 is constructed of a shaft body 74 placed upright on the second reference surface 47, an arm body 75 at a top end of the shaft body 74 in a freely rotatable manner and a fixing member 76 provided at a free end of the arm body 75. As shown by a solid line in FIG. 4, by turning the arm body 75 to a fixed position J, the fixing member 76 of each fixing device 73 moves to a point above each support pin 48 to prevent the base 2 from moving upward. Furthermore, by turning the arm body 75 to an unlocking position K as shown by a virtual line of FIG. 4, the fixing member 76 of each fixing device 73 is retracted outward from above the base 2 which is supported by the support pin 48, which unlocks the magnetic tape recording/reproducing device 1.

As shown in FIG. 1 to FIG. 3, the adjustment stage 42 is provided with turning operation devices 54 to turn the adjusting screws 7 (example of the adjusting member) of the magnetic tape recording/reproducing device 1 supported by the support pin 48. The turning operation device 54 is constructed of a "+" shaped engaging part 55 which can be freely engaged with the engagement groove 8 of the adjusting screw 7, a tip shaft 56 provided with an engaging part 55, a turning operation part 57 which is turned through an external operation, a base end shaft 58 provided with the turning operation part 57, a flexible turning transmission shaft 59 which transmits the turning of the turning operation part 57 to the engaging part 55 and a guide tube 60. There is the same number of turning operation devices 54 as the adjusting screws 7 in a one-to-one correspondence with adjusting screw 7.

The above described turning transmission shaft 59 has flexibility with a wire wound like a coil. One end of the turning transmission shaft 59 is connected to the tip shaft 56 and the other end of the turning transmission shaft 59 is connected to the base end shaft 58. Furthermore, the guide tube 60 is bent in an "L" shape. In the guide tube 60, the turning transmission shaft 59, the lower part of the tip shaft 56 and the back of the base end shaft 58 are inserted in a manner freely rotatable and freely movable in the axial direction respectively. The top end of the back part of the guide tube 60 is attached by being inserted into a through hole formed in a fixing plate 62. Furthermore, the bottom of the front part of the guide tube 60 is attached by being inserted into a through hole formed in an operation plate 63. The fixing plate 62 is attached under the mounting plate 44. The operation plate 63 is attached between a pair of front left and right legs 43.

A plurality of through holes 64 are formed in the mounting plate 44 and support stage 46, having openings at the bottom of the mounting plate 44 and at the top of the support stage 46. Each tip shaft 56 is inserted into each through hole 64. Each tip shaft 56 is located at a position facing the underside of the adjusting screw 7 with the engaging part 55 facing upward. Furthermore, each tip shaft 56 is designed so as to move in the vertical direction (example of engagement/disengagement direction) between an upper limit position A (see FIG. 3) at which the engaging part 55 can engage with the engagement groove 8 and a lower limit position B (see FIG. 3) at which the engaging part 55 retracts into the through hole 64. Each tip shaft 56 is provided with a stopper 65. Each stopper 65 contacts the underside of the mounting plate 44 to regulate the ascending range of the tip shaft 56 to an upper limit position A and also contacts the top surface of the fixing plate 62 to regulate the descending range of the tip shaft 56 to a lower limit position B.

The tip shaft 56 is shifted in the vertical direction by pushing or pulling the turning operation part 57 in the horizontal directions C, D (example of the axial direction of the turning transmission shaft 59). That is, as shown in FIG. 2, pushing in the turning operation part 57 toward the back C causes the tip shaft 56 to ascend up to the upper limit position A. On the other hand, pulling the turning operation part 57 toward the front D causes the tip shaft 56 to descend down to the lower limit position B. Furthermore, the base end shaft 58 is located sideways in the horizontal direction. The turning operation part 57 is disposed in front of the operation plate 63, that is, on the front side of the part positioning device 41.

Hereinafter, the operation in the above described configuration will be explained.

For example, the method of adjusting the height and inclination of the top end face 3a of the C reel 3 with respect to an article reference surface S of the magnetic tape recording/reproducing device 1 using the part positioning device 41 will be explained.

First, a master work whose height and inclination, which are position components, are within specified ranges respectively, is formed into a shape equivalent to that of the magnetic tape recording/reproducing device 1 through cutting work or the like. Using this master work, calibration of the part positioning device 41 will be performed using the following procedure.

Figure 5:
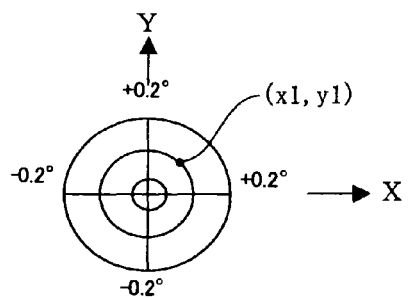
FIG. 5 shows an example of measured values of inclination coordinates measured using the inclination measuring device of the part positioning device according to the embodiment of the present invention.

First, the master work is supported by the support pins 48 and positioned by the positioning members. Then, the inclination coordinates of the top end face of the part corresponding to the C reel of the master work are measured using the inclination measuring device 51b and the measured values of the inclination coordinates at this time are assumed to be adjustment target values (x1, y1) as shown in FIG. 5. Furthermore, the height of the top end face corresponding to the C reel of the master work is measured using the displacement measuring device 51a and the measured value at this time is assumed to be an adjustment target value (h1). Calibration is completed in this way and the operator removes the master work from on the support pin 48 of the part positioning device 41. The above described adjustment target values (x1, y1) (h1) correspond to product design values.

After the above described calibration is completed, the operator causes the magnetic tape recording/reproducing device 1 to be supported by the support pin 48. In this case, the operator inserts the positioning pins 70 into the positioning holes 71 to position the magnetic tape recording/reproducing device 1 and turns the arm body 75 up to the fixed position J as shown by a solid line in FIG. 4 and fixes the magnetic tape recording/reproducing device 1 using the fixing member 76. As shown in FIG. 1 and FIG. 2, the magnetic tape recording/reproducing device 1 is supported and fixed at a normal position by the support pins 48 with the engagement grooves 8 of the adjusting screws 7 facing downward. Then, the measuring device 51 is moved in the X-Y directions using the movable table 50 and positioned above the C reel 3. Next, the inclination coordinates and height of the top end face 3a of the C reel 3 are measured using the inclination measuring device 51b and displacement measuring device 51a of the measuring device 51.

Next, based on the measured values of the inclination coordinates and height displayed on the display sections 51c, 51d, the operator pushes in the turning operation part 57 of the turning operation device 54 corresponding to the adjusting screw 7 of the C reel 3 as shown in FIG. 2 by hand to cause the tip shaft 56 to ascend, causes the engaging part 55 to engage with the engagement groove 8 of the adjusting screw 7 and then turns the turning operation part 57 by hand. This causes the torque of the turning operation part 57 to transmit to the tip shaft 56 through the turning transmission shaft 59, causes the tip shaft 56 to turn and causes the adjusting screw 7 to turn, and the inclination and height of the top end face 3a of the C reel 3 is thereby changed.

The operator measures the inclination and height of the top end face 3a of the C reel 3 using the inclination measuring device 51b and displacement measuring device 51a, turns the turning operation part 57 and adjusts the position of the C reel 3 so that the measured values of the inclination coordinates match the above described adjustment target values (x1, y1) and the measured value of the height matches the above described adjustment target value (h1). This allows the relative height and inclination of the top end face 3a of the C reel 3 with respect to the article reference surface S of the magnetic tape recording/reproducing device 1 to be adjusted.

After the positioning of the C reel 3 is completed, the operator pulls the turning operation part 57 forward in the direction D, causes the tip shaft 56 to descend down to the lower limit position B and causes the engaging part 55 to disengage from the engagement groove 8 of the adjusting screw 7 downward.

The D reel 4 and guide posts 5 can also be positioned in the same way as the above described C reel 3. Furthermore, as shown with the virtual line in FIG. 4, by turning the arm body 75 up to the unlocking position K and unlocking the magnetic tape recording/reproducing device 1, it is possible to lift and remove the magnetic tape recording/reproducing device 1 from on the support pin 48 and replace it with another magnetic tape recording/reproducing device 1.

In the above described adjustment work, the turning operation part 57 is directed frontward where the operator performs operation, which makes easier the turning operation of the turning operation part 57 and pushing/pulling operation (transfer operation) in the directions C, D. Furthermore, simple operation of only pushing/pulling the turning operation part 57 in the directions C, D allows the engaging part 55 to be engaged/disengaged with/from the engagement groove 8 of the adjusting screw 7 of the magnetic tape recording/reproducing device 1. Furthermore, even when the number of adjustment target parts such as reels 3, 4 and guide post 5 increases and the number of adjusting screws 7 also increases accordingly, providing turning operation devices 54 corresponding to the respective adjusting screws 7 allows the respective turning operation devices 54 to easily turn the respective adjusting screws 7. Furthermore, when a plurality of adjusting screws 7 are turned simultaneously, even when the adjusting screws 7 are close to each other, it is possible to prevent screwdrivers from interfering with each other, making operation impossible as in the conventional case. This drastically improves the efficiency of adjustment work.

Furthermore, when the engaging part 55 is engaged with the engagement groove 8 of the adjusting screw 7, the operator need not frequently peer the underside of the magnetic tape recording/reproducing device 1 supported by the support pin 48. This eliminates the necessity for light-shielding work on a laser beam irradiated downward from the displacement and inclination measuring devices 51a, 51b and further improves the efficiency of adjustment work and also improves safety.

Furthermore, since it is possible to bend the turning transmission shaft 59 of the turning operation device 54 flexibly (freely), it is possible to freely set positions of the turning operation parts 57 on the operation plate 63.

In the above described embodiment, the engagement groove 8 of the adjusting screw 7 and the engaging part 55 of the turning operation device 54 are formed in a "+" (plus) shape, the shape is not limited to this and those parts may also be formed in a "−" (minus) shape.

In the above described embodiment, the magnetic tape recording/reproducing device 1 is used as an example of the adjustment target object, but the object is not limited to the magnetic tape recording/reproducing device 1. Moreover, the reels 3, 4 and guide posts 5 are used as examples of the adjustment target parts, the parts are not limited to the reels 3, 4 and guide post 5.

In the above described embodiment, the magnetic tape recording/reproducing device 1 is supported by three support pins 48, but it may be supported by four or more support pins 48. Furthermore, the inclination and height of the reels 3, 4 and guide post 5 are adjusted by three adjusting screws 7 respectively, but these may also be adjusted by one or three or more adjusting screws 7.

As described above, the part positioning device according to the present invention is suitable for applications in adjusting relative inclination and height of the top end face of a part provided on a base with respect to an article reference surface defined for the base.

What is claimed is:

1. A part positioning device (41) for adjusting positions of target parts (3, 4, 5) of an adjustment target object (1) provided with the adjustment target parts (3, 4, 5) and adjusting members (7), the adjustment target object (1) having an article reference surface (S) defined thereon, the adjustment target parts (3, 4, 5) having part reference surfaces (3a, 4a, 5a) formed thereon respectively, wherein a relative height and inclination of each of the part reference surfaces (3a, 4a, 5a) is adjusted with respect to the article reference surface (S) of the adjustment target object (1) by turning the adjusting members (7), the part positioning device comprising:
support members (48) for supporting the adjustment target object (1) at a plurality of locations;
a measuring device (51) for measuring the height and inclination of each of the part reference surfaces (3a, 4a, 5a) of the adjustment target parts (3, 4, 5);
a turning operation device (54) for turning each of the adjusting members (7); and
fixing devices (73) for fixing the adjustment target object (1) supported by the support members (48) in a normal position, wherein each turning operation device (54) comprises an engaging part (55) which is engageable/disengeagable with/from an engaged part (8) formed in the adjusting member (7), a turning operation part (57) which is turned through an external operation, and a bendable turning transmission shaft (59) which transmits the turning of the turning operation part (57) to the engaging part (55), each engaging part (55) is disposed at a position facing the adjusting member (7) and moved in the engagement/disengagement direction with respect to the engaged part (8) by moving the turning operation part (57) in an axial direction of the turning transmission shaft (59) through an external operation, each turning operation part (57) is directed to a side where an operator performs operation, and the fixing devices (73) have fixing members (76) capable of moving to a point above the support members (48) to prevent the adjustment target object (1) from moving upward.

2. The part positioning device (41) according to claim 1, wherein a first reference surface (45) and a second reference surface (47) are formed to have a predetermined positional relationship each other, a movable table (50) is formed on the first reference surface (45), the measuring device (51) is provided on the movable table (50), and the plurality of support members (48) are provided on the second reference surface (47).

3. The part positioning device (41) according to claim 1, wherein the adjustment target object (1) is supported by the support members (48) with the engaged parts (8) formed in the adjusting members (7) facing downward, the measuring device (51) irradiates a laser beam downward from above on the top reference surfaces (3a, 4a, 5a) of the adjustment target parts (3, 4, 5) and measures the height and inclination of the top reference surfaces (3a, 4a, 5a), the engaging part (55) of the turning operation device (54) is disposed to face upward at a position underneath the bottom face of the adjusting member (7), and is caused to move vertically with respect to the engaged part (8) to engage/disengage with/from the engaged part (8) by moving the turning operation part (57) horizontally (directions of C, D) through an external operation, and each turning operation part (57) is provided on the front side where an operator performs operation.

* * * * *